US007548607B2

(12) United States Patent
Cederström

(10) Patent No.: US 7,548,607 B2
(45) Date of Patent: Jun. 16, 2009

(54) REFRACTIVE X-RAY ELEMENT

(75) Inventor: Björn Cederström, Enskede (SE)

(73) Assignee: Sectra Mamea AB (SE)

( * ) Notice: Subject to any disclaimer, the term of this patent is extended or adjusted under 35 U.S.C. 154(b) by 175 days.

(21) Appl. No.: 10/550,139

(22) PCT Filed: Mar. 22, 2004

(86) PCT No.: PCT/SE2004/000432

§ 371 (c)(1),
(2), (4) Date: Jul. 10, 2006

(87) PCT Pub. No.: WO2004/084236

PCT Pub. Date: Sep. 30, 2004

(65) Prior Publication Data

US 2006/0256919 A1 Nov. 16, 2006

(30) Foreign Application Priority Data

Mar. 21, 2003 (SE) .................................... 0300808

(51) Int. Cl.
*G21K 1/06* (2006.01)
*G02B 5/04* (2006.01)

(52) U.S. Cl. ........................... 378/85; 378/84; 359/678; 359/834

(58) Field of Classification Search ............. 378/82–85; 359/558, 569, 571, 574, 576, 678, 721, 831, 359/837, 885, 889–891
See application file for complete search history.

(56) References Cited

U.S. PATENT DOCUMENTS

| | | | | |
|---|---|---|---|---|
| 4,350,410 | A * | 9/1982 | Minott | 359/640 |
| 6,091,798 | A * | 7/2000 | Nygren et al. | 378/84 |
| 6,215,920 | B1 * | 4/2001 | Whitehead et al. | 385/18 |
| 6,668,040 | B2 * | 12/2003 | Cederstrom | 378/84 |
| 2003/0210763 | A1 * | 11/2003 | Polichar et al. | 378/98.3 |

FOREIGN PATENT DOCUMENTS

| | | |
|---|---|---|
| SE | 514223 C2 | 1/2001 |
| WO | WO-01/06518 | 1/2001 |
| WO | WO-01/12345 A1 | 2/2001 |

OTHER PUBLICATIONS

Cederstrom, et al., Multi-Prism X-ray Lens, Aug. 19, 2002, IEEE; Applied Physics Letters, vol. 81, No. 8, pp. 1399-1401.*
Cederstrom, Bjorn. A Multi-Prism Lens for Hard X-rays, Nov. 8, 2002, Thesis-Kungl Tekniska Hogskolan, Stockholm, pp. 5-7, 18, 37-54, 57-60, 69-76, 87-89, 109-112.*

* cited by examiner

*Primary Examiner*—Edward J Glick
*Assistant Examiner*—Anastasia Midkiff
(74) *Attorney, Agent, or Firm*—Lerner, David, Littenberg, Krumholz & Mentlik, LLP

(57) ABSTRACT

For reducing absorption in a refractive element, the present invention relates to a refractive element (10, 20), suitable for refracting x-rays, comprising a body with low-Z material having a first end adapted to receive rays emitted from a ray source and a second end from which the rays received at the first end emerge. The refractive element comprises columns of stacked substantially identical prisms (21). The invention also relates to lens element.

24 Claims, 5 Drawing Sheets

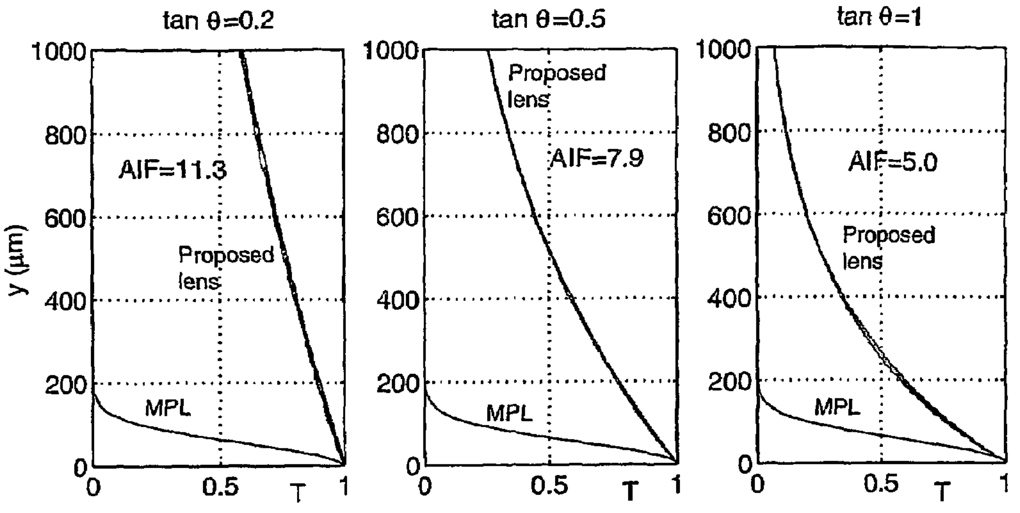
Fig. 5
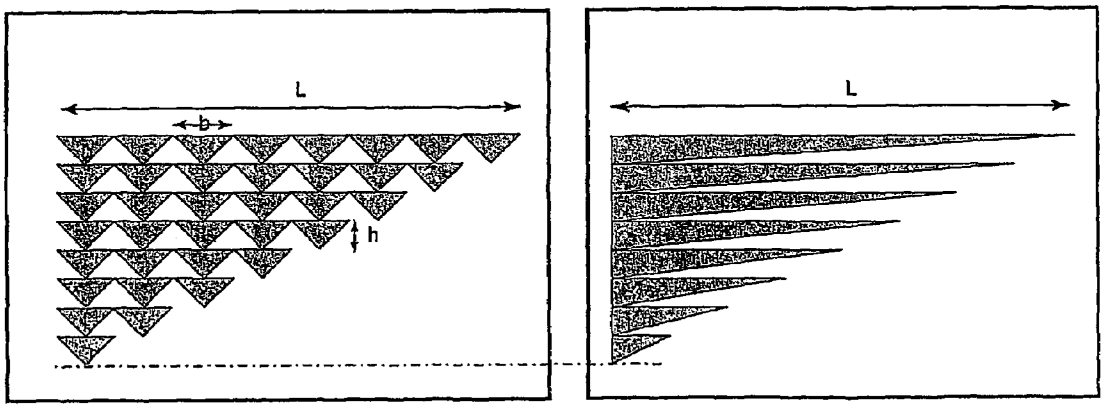
Fig. 6a
Fig. 6b

REFRACTIVE X-RAY ELEMENT

CROSS-REFERENCE TO RELATED APPLICATIONS

The present application is a national stage application under 35 U.S.C. §371 of International Application No. PCT/SE2004/000432, filed Mar. 22, 2004, which claims priority from Swedish Application No. 0300808-3, filed Mar. 21, 2003, the disclosures of which are hereby incorporated by reference herein.

BACKGROUND OF THE INVENTION

1. Technical Field of the Invention

The present invention relates to a refractive element suitable for refracting x-ray beams of the type that comprises a material having sections removed. The invention also relates to a lens comprising the refractive elements.

2. Background of the Invention

WO 01/06518, by the same inventor and same applicant, relates to a refractive arrangement for X-rays, and specially to a lens comprising: a member of low-Z material. The low-Z material has a first end adapted to receive x-rays emitted from an x-ray source and a second end from which the x-rays received at the first end emerge. It further comprises a plurality of substantially triangular formed grooves disposed between the first and second ends. The plurality of grooves are oriented such that, the x-rays which are received at the first end, pass through the member of low-Z material and the plurality of grooves, and emerge from the second end, are refracted to a focal line.

The aperture of a Multi-Prism Lens (MPL) or a.k.a. saw-tooth refractive lens, e.g. as described in WO 01/06518, is limited by absorption of the beam in the lens material. The intensity transmission function of the lens is Gaussian with a root-mean-square (rms) width given by $$\sigma_{abs}=\sqrt{F\delta\iota}, \quad (1),$$

where F is the focal length, δ is the decrement of the real part of the index of refraction, and l is the attenuation length. The aperture in turn limits the possible intensity gain and diffraction-limited resolution. Apart from the focal length, the aperture is only a function of the material properties, and is thus a true physical limit. Choosing a material with lowest possible atomic number maximizes it. Until now, various polymers, diamond, beryllium, silicon and lithium have been used as lens materials. The choice of material is of course also restricted by available fabrication methods and is furthermore a cost issue.

The focusing power of a lens is a function of the phase-shift of the outgoing wave. If a cylindrical wave (=phase-shift) is created, the wave will converge to a line focus. In a regular MPL, for a large portion of the lens aperture, the wave is phase-shifted much more than 2π (or 360°). In other words, rays will pass a thickness of material larger than the 2π-shift length given by $$L_{2\pi}=\lambda/\delta \quad (2).$$

This length is of the order of 10-100 μm for hard x-rays; λ is the wavelength.

SUMMARY OF THE INVENTION

The main object of the preferred embodiment of the present invention is to overcome the above-mentioned limitation.

Consequently, a main difference between the preferred embodiment of the present invention and WO 01/06518 is to improve characteristics by reducing material.

Thus, the absorption of the MPL is reduced. The lens aperture and intensity gain are increased substantially, and also diffraction-limited resolution is improved. This will leave the phase of the wave unchanged and does not alter the focusing properties.

For these reasons, a refractive X-ray element is provided according to the preferred embodiments of the present invention. The refractive element, suitable for refracting x-rays, comprising a body of low-Z material having a first end adapted to receive rays emitted from a ray source and a second end from which the rays received at the first end emerge. The refractive element comprises columns of stacked substantially identical prisms. The prisms are produced by removal of material corresponding to a multiple of a phase-shift length ($L_{2n}$) of a multiple of 2n. Preferably, an intensity transmission of the element is $$T(y)=\exp(-X(y)/\iota)=\exp(-k|y|\iota)$$

wherein X(y) is the total path length for a ray through the element, l is an attenuation length, k is constant and y is the distance to the optical axis. The effective aperture is defined by:

$$D=\frac{8\delta^2 lF}{\lambda\tan\theta}$$

wherein F is the focal length, δ is the decrement of a real part of an index of refraction, / is an attenuation length and Θ is the side angle of the prisms. The aperture increase factor (AIF) is defined by:

$$AIF=3.2\cdot\frac{\sigma_{abs}}{L_{2\pi}\tan\theta}$$

wherein $\sigma_{abs}$ is root-mean-square width of MPL aperture, $L_{2\pi}$ is 2π-shift length, and Θ is the side angle of the prisms.

Most preferably, the element comprises of one or several of Silicon or diamond.

According to the preferred embodiment, a focal length is controlled by a deviation length ($y_g$) of one end of the element with respect to the incident ray.

The invention also relates to a lens, suitable for x-rays, comprising a body with low-Z material having a first end adapted to receive rays emitted from a ray source and a second end from which the rays received at the first end are refracted. The lens comprises two portions, each portion having columns of stacked substantially identical prisms, each portion being arranged in an angle relative to each other. The prisms are produced by removal of material corresponding to a multiple of a phase-shift length ($L_{2n}$) of a multiple of 2n. The columns are displaced relative to each other. In one embodiment, the columns are rotated relative each other. The columns may be arranged in series.

The invention also relates to an x-ray apparatus comprising at least an x-ray source and a detector assembly, further comprising a refractive element having above-mentioned features.

The invention also relates to an x-ray apparatus comprising at least an x-ray source and a detector assembly, further comprising a lens having above-mentioned features.

The invention also provides for a method for fabricating an element having above-mentioned features, the method comprising: providing an element comprising prism-patterns and removing parts said element to provide prisms to be assembled to a said element. Preferably, the prism patterns are provided by lithographic patterning. The removal is achieved by a subsequent deep-etching in silicon.

The invention also provides for a method for reducing absorption in multi-prism lens, the method comprising removing material only resulting in a phase-shift of a multiple of 2π.

BRIEF DESCRIPTION OF THE DRAWINGS

In the following, the present invention will be described in a non-limiting way with reference to enclosed drawings, in which:

FIG. 5 is a diagram illustrating another lens transmission, according to one exemplary embodiment of the invention, FIGS. 6*a* and 6*b* illustrate a special case of MPL with minimized absorption.

DETAILED DESCRIPTION

The basic idea is to remove material corresponding to a multiple of $L_{2\pi}$, preferably made of a low-Z material. Thus, the absorption of the MPL is reduced by removing material only resulting in a phase-shift of a multiple of 2π. However, absorption can be substantially reduced and thus the aperture increased. This is analogous to the concept of Fresnel lenses. Notice, however, that the proposed lens will still be comprised of structures with only flat surfaces. Also, the focal length can still be changed mechanically, by varying the angle between the lens and the beam direction (α).

Figure 1A:
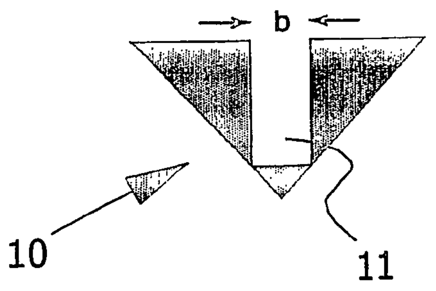
FIG. 1 is a schematic cross-sectional view of a loose geometry of an element, according to one embodiment of the invention.
Figure 1B:
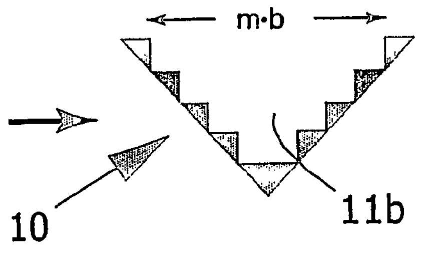

Consider first the following structure, in which a channel 11 is made through a prism 10 with a width of the 2π-shift length (b), as illustrated schematically in FIG. 1*a*. Subsequent channels 11*b* with widths of multiple 2π-shift lengths (m.b.) can be made, until the lens has a staircase profile on the inside.

Figure 2:
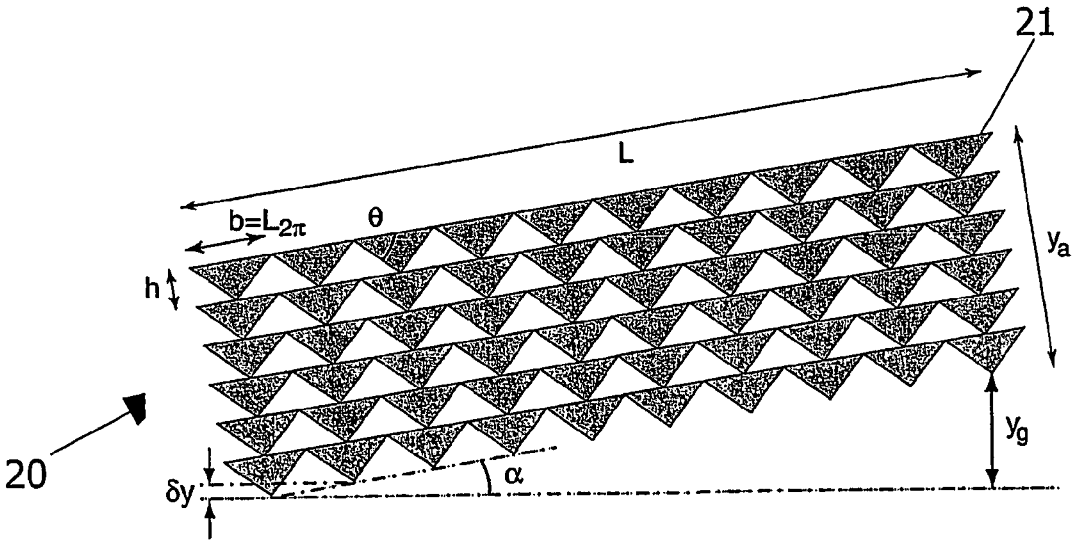
FIG. 2 is a schematic side view of the compact geometry of a refractive element, according to one preferred embodiment of the invention.

A better way would be to compact a hollow prism 20 into a column of identical small prisms 21, illustrated in FIG. 2, which shows a preferred embodiment of a refractive element according to the first aspect of the invention.

Figure 3:
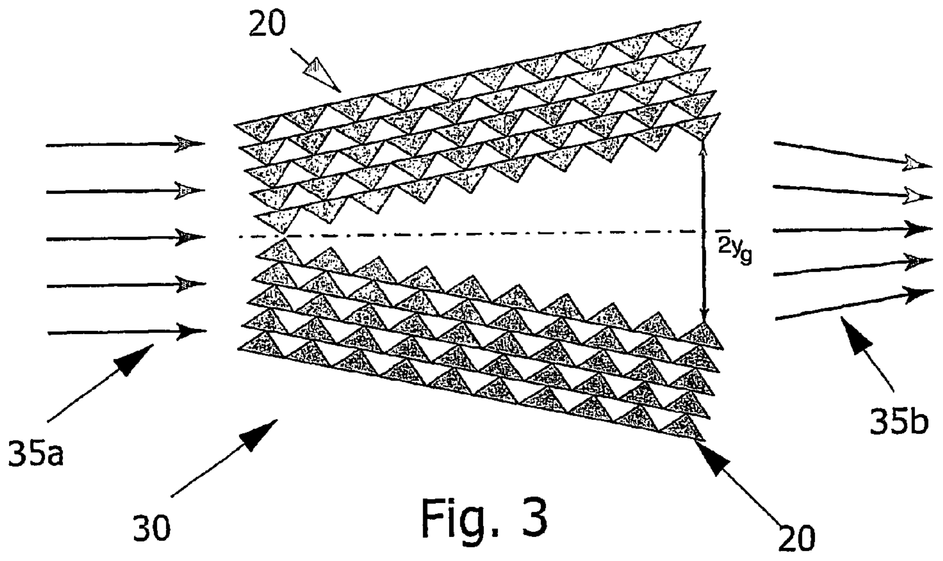
FIG. 3 is a schematic side view of lens element according to one preferred embodiment of the invention.

A lens 30 according to a second aspect of the invention is illustrated in FIG. 3. The lens comprises two refractive elements 20, as illustrated in FIG. 2. The lens is formed by arranging the refractive elements edge-to-edge in one end and edges spaced apart at the other end; thus forming a substantially triangle-shaped lens. Rays 35*a* incident at one gable, i.e. the edge-to-edge end of the elements, are refracted and focused rays 35*b* at the spaced apart edge. Preferably, the focal length is controlled by $y_g$.

Following definitions and geometrical relations are valid concerning the element 20 in FIG. 2:

$$\tan\Theta=2h/b,\ y_a=M\cdot h,\ L=N\cdot b,\ \alpha=y_g/L \tag{3}$$

wherein Θ is the angle between the triangle shaped prism sides, h is the height of a triangle shaped prism, b is the base width of a triangle shaped prism, $y_g$ is the inclination height of the column, $y_a$ is the column height, M is the number of the prisms in height direction, L is the length of the column, N is the number of the prisms in the length direction, and α is the inclination angle of the columns.

Calculation of projected lens profile

The phase condition is $$b=nL_{2\pi}=n\lambda/\delta, \tag{4}$$

where n is an integer; In the following, it is assumed that n=1, δ is the decrement of the real part of the index of refraction and λ is the wavelength.

The thickness of the material in the first column at a lateral position y is:

$$x(y)=\mathrm{mod}(2y/\tan\theta,b), \tag{5}$$

where mod( ) is the remainder after division.

The next column will be displaced a distance δy=bα (α can be small), and in the $i^{th}$ column (starting at 0) the displacement is i·δy. An incoming ray, parallel with the optical axis, will go through a thickness of material in the $i^{th}$ column given by $$x_i(y)=x(y-i\cdot\delta y)=\mathrm{mod}\left(\frac{2(y-i\cdot\delta y)}{\tan\theta},b\right), \tag{6}$$

and the total path length is $$X(y)=\sum_{i=0}^{div(y,\delta y)}x_i(y)=\sum_{i=0}^{div(y,\delta y)}\mathrm{mod}\left(\frac{2(y-i\cdot\delta y)}{\tan\theta},b\right). \tag{7}$$

Let us write y=(j+t)δy, where is an integer and 0≦t<1.

$$X(y)=\sum_{i=0}^{j}\mathrm{mod}\left(\frac{2\delta y}{\tan\theta}(j+t-i),b\right) \tag{8}$$

$$X(j,t)=\sum_{i=0}^{j}\left[\frac{2\delta y}{\tan\theta}(i+t)-b\cdot div\left(\frac{2\delta y}{\tan\theta}(i+t,b)\right)\right] \tag{9}$$

$$X(j,t)=\frac{\delta y}{\tan\theta}[j(j+1)+2(j+1)t]-b\sum_{i=0}^{j}div\left(\frac{2\delta y}{\tan\theta}(i+t,b)\right) \tag{10}$$

Small-Scale Variation

The first term is the well-known term for a multi-prism lens. The deviation from a parabola with apex in y=−δy/2 is $$\delta X(j,t)=\frac{\delta y}{\tan\theta}[(j+t+1/2)^2-j(j+1)-2(j+1)t]=\frac{\delta y}{\tan\theta}[1/4+t(t-1)]. \tag{11}$$

The constant phase-shift can be neglected and calculate the rms-deviation over the segment, $$\langle\delta X(t)\rangle_t=\frac{\delta y}{\tan\theta}\left(\int_0^1 t^2(t-1)^2\,dt\right)^{1/2}=\frac{\delta y}{\sqrt{30}\cdot\tan\theta}=L_{2\pi}\frac{\alpha}{\sqrt{30}\cdot\tan\theta}\ll L_{2\pi}, \tag{12}$$

for all reasonable values. The parabolic approximation yields $$X_0(j)\approx\frac{\delta y}{\tan\theta}j^2=\frac{y^2}{\delta y\tan\theta}\equiv\frac{y^2}{2R}, \tag{13}$$

and the focal length is:

$$F=\frac{R}{\delta}=\frac{\delta y\tan\theta}{2\delta}=\frac{b\alpha\tan\theta}{2\delta}=\frac{\lambda\alpha\tan\theta}{2\delta^2}, \tag{14}$$

Since the second term of equation (10) cannot change the phase of the wave (other than±m·2n), it will not have any influence on the focusing.

Large-Scale Profile

Studying the term by introducing γ through b=y·2δy/tan θ.

$$X'(j,t)=b\sum_{i=0}^{j}div(i+t,\gamma)=b\sum_{i=0}^{j}div(i,\gamma)\approx\frac{\delta y}{\tan\theta}(j^2+j-\gamma j). \tag{15}$$

The result is:

$$X(y)=X_0(y)-X'(y)=\frac{\delta y}{\tan\theta}j\gamma=\frac{b\tan\theta}{4\delta F}\cdot y, \tag{16}$$

and since b=$L_{2n}$=λ/δ.

$$X(y)=\frac{\lambda\tan\theta}{4\delta^2F}\cdot y\equiv k\cdot y \tag{17}$$

γ should be replaced by γ−1 for integers. In most situations, however, γ is relatively large in which case a small error can be obtained.

Transmission and Gain

The intensity transmission is $$T(y)=\exp(-X(y)/\iota)=\exp(-k|y|\iota) \tag{18}$$

and the effective aperture $$D=\int_{-\infty}^{\infty}\exp(-k|y|/l)\,dy=\frac{2l}{k}=\frac{8\delta^2 lF}{\lambda\tan\theta}. \tag{19}$$

For the multi-prism lens we have $$D_{MPL}=\sqrt{2\pi}\sigma_{abs}=\sqrt{2\pi}\cdot\sqrt{\delta\iota F}. \tag{20}$$

The aperture increase factor (AIF) is $$AIF=\frac{D}{D_{MPL}}=3.2\cdot\frac{\delta^{3/2}\sqrt{lF}}{\lambda\tan\theta}, \tag{21}$$

or, perhaps better expressed, $$AIF=3.2\cdot\frac{\sigma_{abs}}{L_{2\pi}\tan\theta} \tag{22}$$

Using a material such as diamond, for example, will at 20 keV with F=0.2 m give AIF=4.5/tan θ.

There is a dependency between the material and energy:

Assuming low energy, so that Compton scattering can be neglected:

$$D\propto\frac{\delta^2 l}{\lambda}\propto\frac{\rho^2E^{-4}\rho^{-1}Z^{-3.2}E^3}{E^{-1}}=\frac{\rho}{Z^{3.2}}. \tag{23}$$

Assuming high energy, so that photo-absorption can be neglected:

$$D\propto\frac{\delta^2 l}{\lambda}=\frac{\rho^2E^{-4}\rho^{-1}}{E^{-1}}=\frac{\rho}{E^3}. \tag{24}$$

wherein ρ is density and Z=atomic number.

Thus, it is evident that by interesting results:

The material density plays a role, which it does not for the MPL.

The dependence on atomic number is stronger than for the MPL.

There is no optimal energy. The aperture (gain) reaches a plateau for low energies.

These factors combined make diamond 15 times better than for example Silicon (Si) at 20 keV. For the MPL the ratio will be less than 3.

Figure 4:
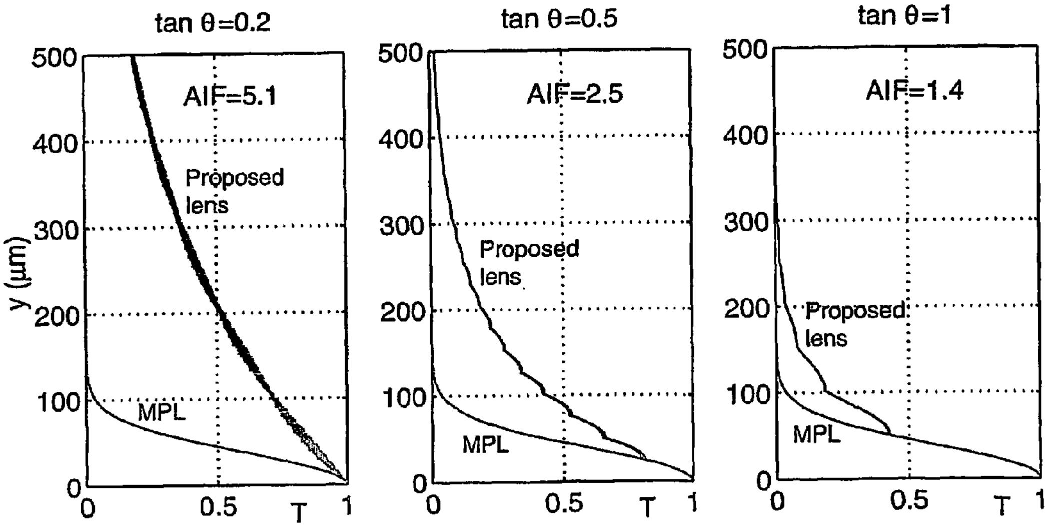
FIG. 4 is a diagram illustrating a lens transmission, according to one exemplary embodiment of the invention.

FIG. 4 illustrates lens transmissions for a lens with reduced absorption and a normal MPL for comparison. Si is used as lens material, with F=83 cm at 40 keV. From left to right in the diagrams tan Θ varies with 0.2, 0.5 and 1 giving AIFs 5.1, 2.5 and 1.4, respectively.

FIG. 5 illustrates Lens transmission for a lens with reduced absorption and a normal MPL for comparison. The lens is made of diamond with F=27 cm at 20 keV. From left to right in the diagrams tan Θ varies with 0.2, 0.5 and 1 giving AIFs 11.3, 7.9 and 5.0, respectively.

In the following a special case is investigate with y=1. This means that adjacent columns are shifted exactly one prism, giving $X(y)_{t=0}=0$. See illustrated lens in FIGS. 6*a* and 6*b*. FIG. 6*a* illustrates a real lens and FIG. 6*b* the ray projection profile.

From the expression derived above, it is found:

$$\langle \delta X(t) \rangle_t = L_{2\pi}\frac{\alpha}{\sqrt{30}\cdot\tan\theta} = \frac{L_{2\pi}}{2\sqrt{30}}. \tag{25}$$

The rms phase error is $\sigma_{100}=\pi/\sqrt{30}$ and the intensity reduction factor (IRF) is $$IRF=\exp(-\sigma_\phi^2)=\exp(-\pi^2 30)=0.72. \tag{26}$$

Thus, the intensity is reduced by 28% compared to a perfect parabolic lens.

Using $2\alpha=\tan\theta$ gives $$F = \frac{b\alpha\tan\theta}{2\delta} = \frac{L_{2\pi}\tan^2\theta}{4\delta} = \frac{\lambda\tan^2\theta}{4\sigma^2} \tag{27}$$

In this energy regime, it is a rather good approximation to take $$\delta=2\cdot10^{-4}\rho E^{-2} \tag{28}$$

if ρ and E are expressed in g/cm$^3$ and keV, respectively. Using λ=12.4 Å/E, the result is:

$$F = \frac{12.4\cdot10^{-10}\tan^2\theta}{4\cdot4\cdot10^{-8}\rho^2E^{-3}}m = 7.7\text{mm}\cdot\frac{E^3\tan^2\theta}{\rho^2} \tag{29}$$

For a diamond, for example, at 15 keV, F=2.1 m·tan$^2$ θ, and if tan θ=¼ then F=13 cm. Thus, targeted focal lengths can be reached with reasonable values of θ.

For this special case, the profile can be given as $$X(j,t)=t(j+1)L_{2\pi}, \tag{30}$$

and the transmission $$T(j,t)=\exp(-t(j+1)L_{2\pi}/\iota). \tag{31}$$

Averaging over t gives $$T(j) = \frac{l[1-\exp(-(j+1)L_{2\pi}/l)]}{(j+1)L_{2\pi}}. \tag{32}$$

Summing over the lens aperture gives the effective aperture $$D = \delta y\sum_{j=1}^{\infty}T(j) = \infty. \tag{33}$$

Consequently, a lens with "infinite" aperture is provided. This is of little practical importance though, since the sum increases very slowly for large j:s.

Let us change variables through $j=q\cdot l/L_{2\pi}$. It is a good approximation to take $$D(q) = \delta y\sum_{j=1}^{ql/L_{2\pi}}\frac{1-\exp(-j)}{j}\cdot\frac{l}{L_{2\pi}} \approx \frac{\delta y\cdot l}{L_{2\pi}}\ln(q+1) = \frac{l}{2}\tan\theta\ln(q+1). \tag{34}$$

$$D(y_a) = \frac{l}{2}\cdot\ln\left(\frac{2y_a}{l\tan\theta}+1\right)\tan\theta. \tag{35}$$

Naturally, $D(y_a)\rightarrow y_a$, $y_a\rightarrow 0$.

Figure 7:
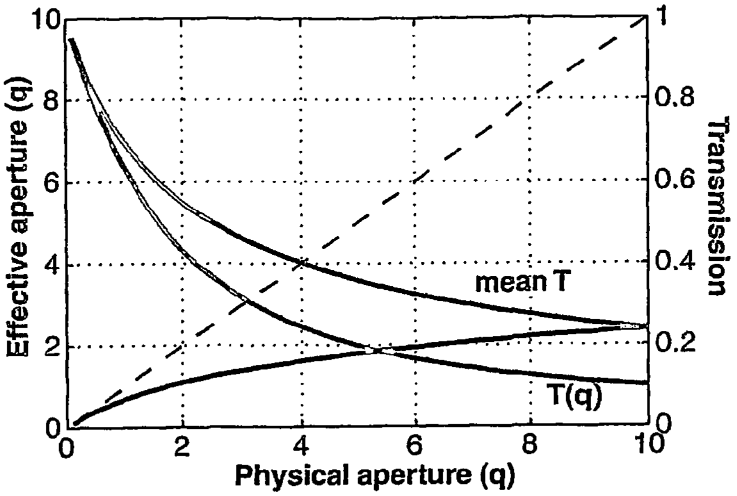
FIG. 7 is a diagram illustrating transmission and averaged transmission as a function of physical lens aperture in a special case of the invention.

Transmission and averaged transmission as a function of physical lens aperture described by the dimensionless parameter q is illustrated in FIG. 7. This pertains only to the special case y=1.

Assume in the following q=10. Perhaps it is more useful to see how D depends on F. After some algebra we get $$D=2\delta\iota\sqrt{F/\lambda}. \tag{36}$$

Then, the gain is ($F<<s_o$):

$$G = 0.94\cdot\frac{s_oD}{d_oF}. \tag{37}$$

The refractive element and the lens according to the invention can be fabricated in various ways. According to a preferred embodiment, it is possible to form these structures by standard lithographic patterning and subsequent deep-etching in silicon. These lenses can then be used as moulds for chemical vapor deposition of diamond. For best performance, the angle θ should be as small as this process may allow.

Figure 8:
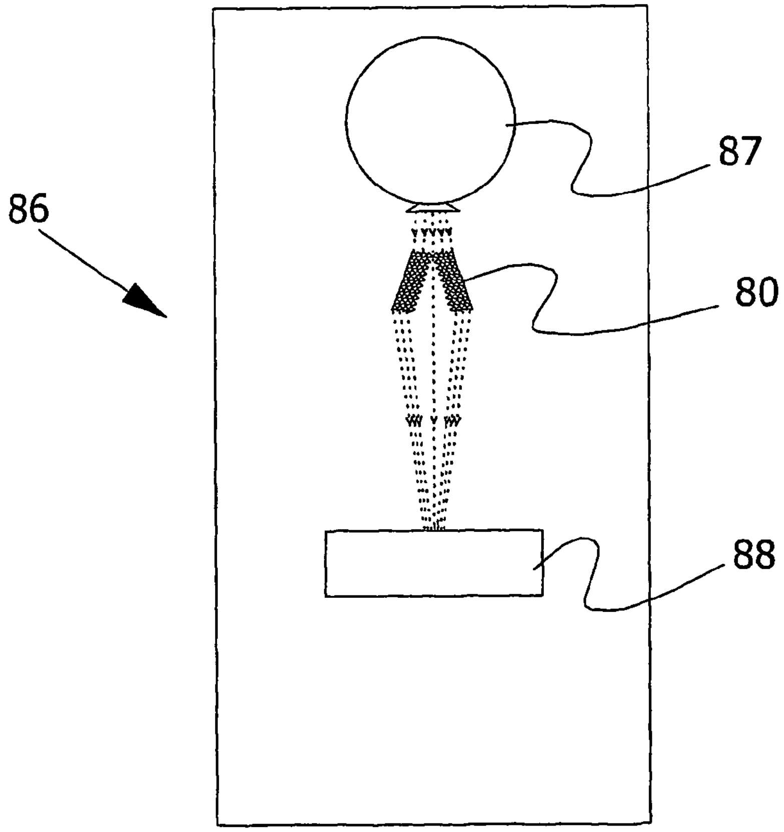
FIG. 8 is a very schematic frontal view of an x-ray apparatus employing a lens according to the present inventions.

The lens according to the preferred embodiment of the invention can be used in an x-ray apparatus 86, as illustrated very schematically in FIG. 8, comprising an x-ray source 88, the lens 80 (combined refractive elements) and a detector assembly 87. Of course, the apparatus can comprise an array of refractive elements or lenses and the lenses can be arranged in a different position in the ray path. The detector assembly can be any of a film, a semiconductor detector, gaseous detector, etc.

Figure 9:
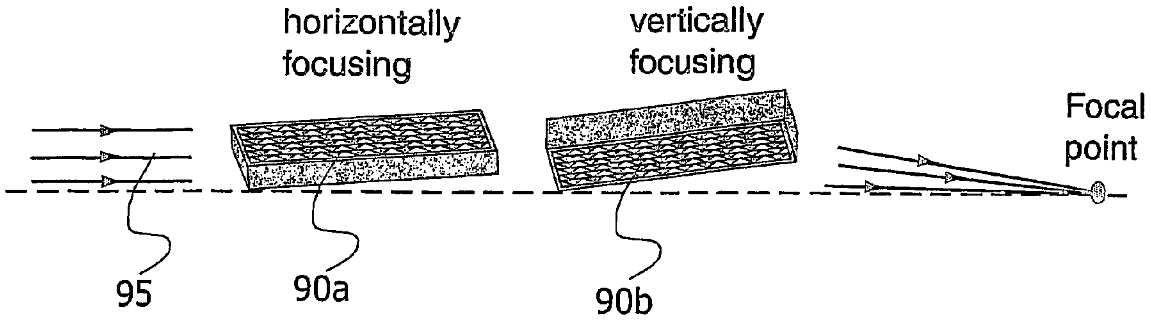
FIG. 9 is a very schematic perspective view of two serially arranged refractive elements, according to one embodiment of the present invention.

All calculations above pertain to using only one lens half, i.e. a refractive element. Of course, as for the MPL, two halves can be used to double the aperture and intensity. These lenses are focusing in one direction only. Two lenses can be used to form a point focus if one is rotated, e.g. 90° around the optical axis. FIG. 9 illustrates two refractive elements 90*a* and 90*b* arranged displaced relative each other in series. Element 90*a* is to focus the rays 95 horizontally while the element 90*b* is arranged for vertical focusing.

The invention is not limited to the shown embodiments but can be varied in a number of ways without departing from the scope of the appended claims and the arrangement and the method can be implemented in various ways depending on application, functional units, needs and requirements etc.

The invention claimed is:

1. An x-ray refractive element formed of a body of low-Z material having a first end adapted to receive x-rays emitted from an x-ray source and a second end from which the x-rays received at the first end emerge, said x-ray refractive element comprising:

a first row of substantially identical prisms disposed between said first end and said second end along a first direction, and a second row of substantially identical prisms disposed between said first and second ends along the first direction, each of said prisms of said first row and each of said prisms of said second row being of a substantially triangular shape having two side portions and one base portion, said first row of substantially identical prisms being arranged on top of said second row of substantially identical prisms in a second direction perpendicular to the first direction such that a base portion of a given prism in said first row faces an intersection point of said side portions of a given prism in said second row.

2. The x-ray refractive element of claim 1, wherein said prisms of said first and second rows are produced by removal of material, the removed material having a width corresponding to a multiple of a phase-shift length ($L_{2\pi}$) of $2\pi$.

3. The x-ray refractive element of claim 1, wherein an intensity transmission of the x-ray refractive element is:

$$T(y)=\exp(-X(y)/l)=\exp(-k|y|l),$$

where X(y) is the total path length for a ray through the element, l is an attenuation length, k is constant and y is the distance to the optical axis.

4. The x-ray refractive element of claim 1, wherein an effective aperture is defined by:

$$D=\frac{8\delta^2 lF}{\lambda\tan\theta},$$

where F is the focal length, δ is the decrement of a real part of an index of refraction, l is an attenuation length and Θ is the side angle of the prisms.

5. The x-ray refractive element of claim 1, wherein an aperture increase factor (AIF) is defined by:

$$AIF=3.2\cdot\frac{\sigma_{abs}}{L_{2\pi}\tan\theta},$$

where $\sigma_{abs}$ is root-mean-square width of a Multi-Prism Lens (MPL) aperture, $L_{2\pi}$ is $2\pi$-shift length, and Θ is the side angle of the prisms.

6. The x-ray refractive element of claim 1, wherein said x-ray refractive element is made of one or more of silicon and diamond.

7. The x-ray refractive element of claim 1, wherein a focal length is controlled according to a deviation length ($y_g$) of one end of the element with respect to an incident ray.

8. An x-ray lens formed of a body of low-Z material having a first end adapted to receive rays emitted from an x-ray source and a second end from which the rays received at the first end are refracted, wherein said x-ray lens is comprised of two portions, each of said portions comprising:

a first row substantially identical prisms, disposed between said first end and said second end along a first direction, and a second row of substantially identical prisms disposed between said first and second ends along the first direction, each of said prisms of said first row and each of said prisms of said second row being of a substantially triangular shape having two side portions and one base portion, said first row of substantially identical prisms being arranged on top of said second row of substantially identical prisms in a second direction perpendicular to the first direction such that a base portion of a given prism in said first row faces an intersection point of said side portions of a given prism in said second row.

9. The x-ray lens of claim 8, wherein said prisms of said first and second rows are produced by removing material, the removed material having a width corresponding to a multiple of a phase-shift length ($L_{2\pi}$) of $2\pi$.

10. The x-ray lens of claim 8, wherein said first and second rows are displaced relative to each other.

11. The x-ray lens of claim 10, wherein said first and second rows are rotated relative to each other.

12. The x-ray lens of claim 10, wherein said first and second rows are arranged in series.

13. An x-ray apparatus, comprising:

at least one x-ray source;

a detector assembly; and an x-ray refractive element comprising a body of low-Z material having a first end adapted to receive x-rays emitted from an x-ray source and a second end from which the x-rays received at the first end emerge, said x-ray refractive element comprising:

a first row of substantially identical prisms disposed between said first end and said second end along a first direction, and a second row of substantially identical prisms disposed between said first and second ends along the first direction, each of said prisms of said first row and each of said prisms of said second row of being of a substantially triangular shape having two side portions and one base portion, said first row of substantially identical prisms being arranged on top of said second row of substantially identical prisms in a second direction perpendicular to the first direction such that a base portion of a given prism in said first row faces an intersection point of said side portions of a given prism in said second row.

14. An x-ray apparatus, comprising:

at least one x-ray source;

a detector assembly; and an x-ray lens formed of a body formed of low-Z material having a first end adapted to receive rays emitted from an x-ray source and a second end from which the rays received at the first end are refracted, wherein said x-ray lens is comprised of two portions, each of said portions comprising:

a first row of substantially identical prisms, disposed between said first end and said second end along a first direction, and a second row of substantially identical prisms disposed between said first and second ends along the first direction, each of said prisms of said first row and each of said prisms of said second row being of a substantially triangular shape having two side portions and one base portion, said first row of substantially identical prisms being arranged on top of said second row of substantially identical prisms in a second direction perpendicular to the first direction such that a base portion of a given prism in said first row faces an intersection point of said side portions of a given prism in said second row.

15. The x-ray apparatus of claim 13, wherein said prisms of said first and second rows are produced by removal of material, the removed material having a width corresponding to a multiple of a phase-shift length ($L_{2\pi}$) of $2\pi$.

16. The x-ray apparatus of claim 13, wherein an intensity transmission of the element is:

$$T(y)=\exp(-X(y)/l)=\exp(-k|y|l),$$

where X(y) is the total path length for a ray through the element, l is an attenuation length, k is constant and y is the distance to the optical axis.

17. The x-ray apparatus of claim 13, wherein an effective aperture is defined by:

$$D=\frac{8\delta^2 lF}{\lambda\tan\theta},$$

where F is the focal length, δ is the decrement of a real part of an index of refraction, l is an attenuation length and Θ is the side angle of the prisms.

18. The x-ray apparatus of claim 13, wherein an aperture increase factor (AIF) is defined by:

$$AIF=3.2\cdot\frac{\sigma_{abs}}{L_{2\pi}\tan\theta},$$

where $\sigma_{abs}$ is root-mean-square width of Multi-Prism Lens (MPL) aperture, $L_{2\pi}$is 2π-shift length, and Θ is the side angle of the prisms.

19. The x-ray apparatus of claim 13, wherein said x-ray refractive element is made of one or more of silicon and diamond.

20. The x-ray apparatus of claim 13, wherein a focal length is controlled according to a deviation length ($y_g$) of one end of the element with respect to an incident ray.

21. The x-ray apparatus of claim 14, wherein said prisms of said first and second rows are produced by removing material, the removed material having a width corresponding to a multiple of a phase-shift length ($L_{2\pi}$) of 2π.

22. The x-ray apparatus of claim 14, wherein said first and second rows are displaced relative to each other.

23. The x-ray apparatus of claim 22, wherein said first and second rows are rotated relative to each other.

24. The x-ray apparatus of claim 22, wherein said first and second rows are arranged in series.

* * * * *

UNITED STATES PATENT AND TRADEMARK OFFICE
Certificate

Patent No. 7,548,607 B2

Patented: June 16, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Björn Cederström, Enskede (SE); and Carolina Ribbing, Uppsala (SE).

Signed and Sealed this Twenty-first Day of September 2010.

Edward J. Glick
*Supervisory Patent Examiner*
Art Unit 2882
Technology Center 2800